(12) United States Patent
Rhodes

(10) Patent No.: US 7,093,119 B2
(45) Date of Patent: Aug. 15, 2006

(54) METHODS AND COMPUTER PROGRAM PRODUCTS FOR PROTECTING SOURCE CODE OF AN INTERPRETED PROGRAMMING LANGUAGE

(75) Inventor: James J. Rhodes, Bethlehem, PA (US)

(73) Assignee: International Business Machines Corporation, Armonk, NY (US)

( * ) Notice: Subject to any disclaimer, the term of this patent is extended or adjusted under 35 U.S.C. 154(b) by 827 days.

(21) Appl. No.: 10/196,534

(22) Filed: Jul. 16, 2002

(65) Prior Publication Data

US 2004/0015710 A1    Jan. 22, 2004

(51) Int. Cl.
*H04L 9/00* (2006.01)

(52) U.S. Cl. .......................................... 713/2; 713/189

(58) Field of Classification Search .................... 713/2, 713/189–200, 201
See application file for complete search history.

(56) References Cited

U.S. PATENT DOCUMENTS

| | | | |
|---|---|---|---|
| 4,446,519 A * | 5/1984 | Thomas | 711/164 |
| 4,465,901 A * | 8/1984 | Best | 713/190 |
| 4,685,055 A * | 8/1987 | Thomas | 705/56 |
| 5,724,425 A | 3/1998 | Chang et al. | 380/25 |
| 6,219,787 B1 | 4/2001 | Brewer | 713/167 |
| 6,266,416 B1 | 7/2001 | Sigbjornsen et al. | 380/255 |
| 6,389,385 B1 | 5/2002 | King | 703/27 |

* cited by examiner

*Primary Examiner*—Thomas R. Peeso
(74) *Attorney, Agent, or Firm*—David R. Irvin; Arthur J. Samodovitz

(57) ABSTRACT

Methods and computer program products for protecting interpreted-language source code from unauthorized copying, alteration, distribution, or reverse engineering, without regard to the choice of programming language. A language identifier and the source code are input to an encoding program, which provides an encrypted file that includes the language identifier and source code. The encrypted file is input to a decoding program. The decoding program decrypts the language identifier and opens a suitable interpreter. The decoder then decrypts an encrypted source code instruction and inputs the result to the interpreter, looping through the instructions until reaching the end of the encrypted file, passing decrypted instructions to the interpreter at a rate suitable for execution by the interpreter substantially in real time. Thus a single decoding program may be used with a number of different interpreted languages, and with a number of existing interpreters.

8 Claims, 2 Drawing Sheets

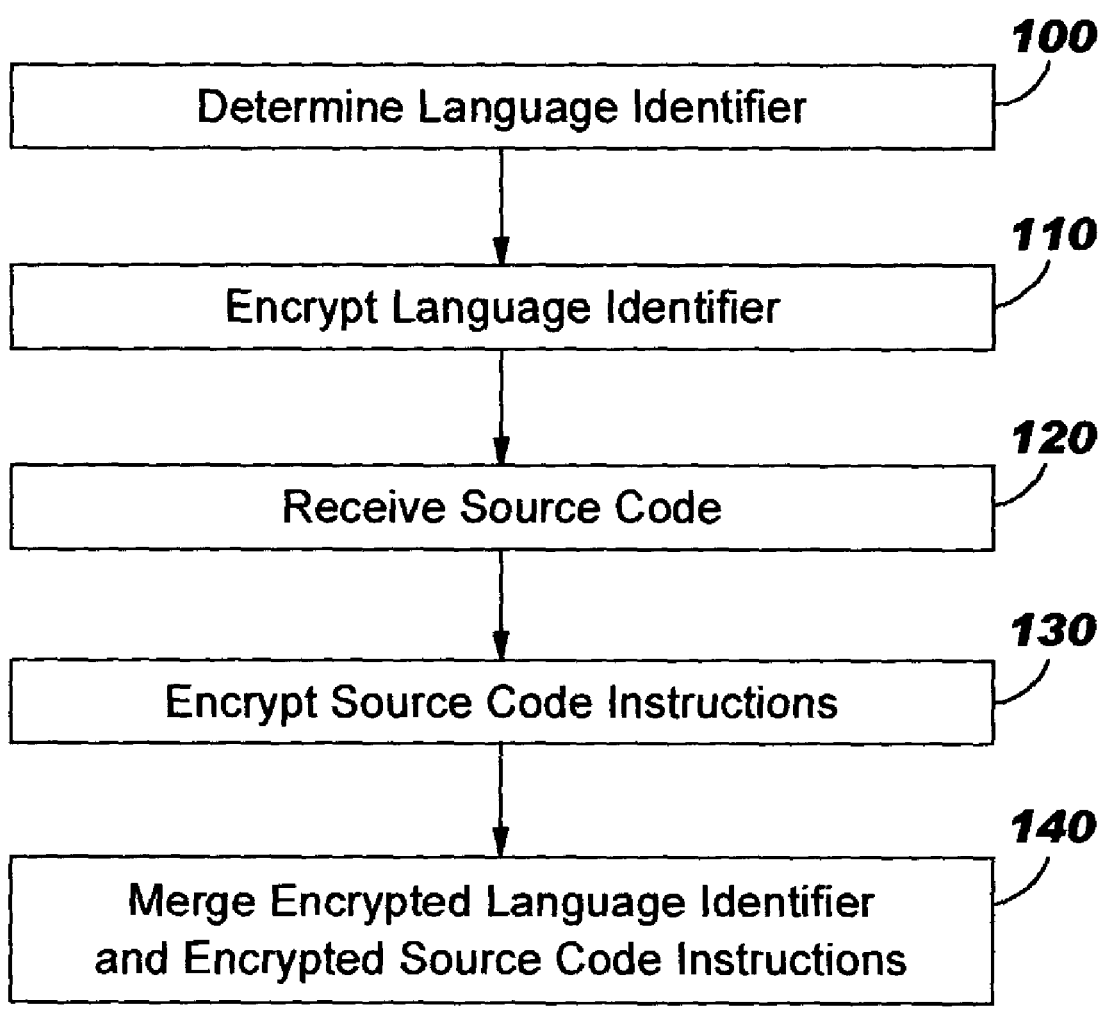

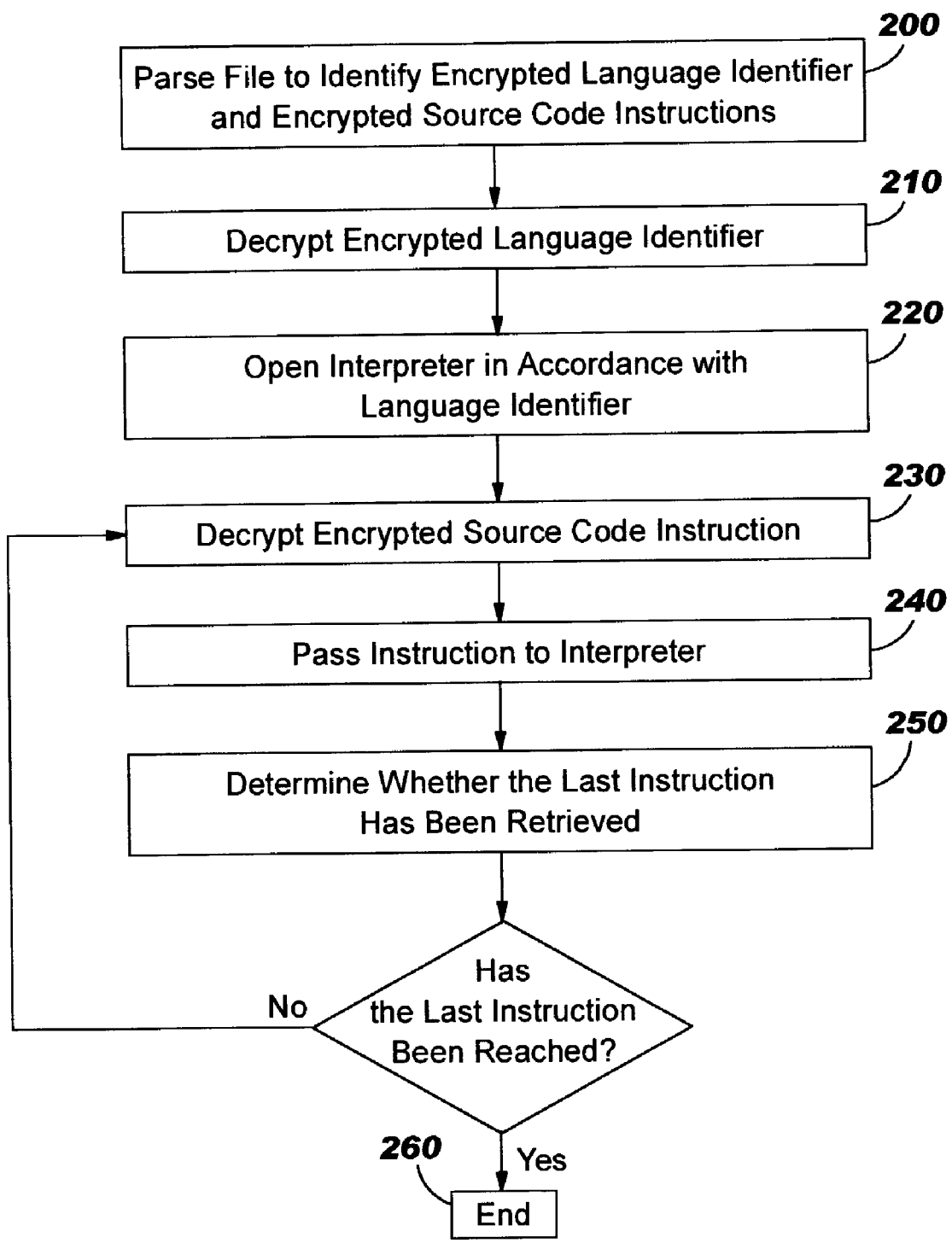

METHODS AND COMPUTER PROGRAM PRODUCTS FOR PROTECTING SOURCE CODE OF AN INTERPRETED PROGRAMMING LANGUAGE

FIELD OF THE INVENTION

The present invention relates to the field of computer software, and more particularly to the field of protecting computer software written in an interpreted language so that it cannot readily be altered, copied, distributed, or reverse engineered by unauthorized parties.

BACKGROUND

An important distinction in the nature of computer software is the distinction between software that is written in a complied language and software that is written in an interpreted language. When software is written in a complied language, a software provider may license associated machine code to customers. When software is written in an interpreted language, however, only the source code itself is available for licensing.

Source code is run by an interpreter, which executes each source-code instruction individually. Unfortunately, exposing the source code to an interpreter opens the risk that an unauthorized party will copy, alter, distribute, or reverse engineer the software. Thus, a software provider must often choose between the security offered by a compiled language and the simplicity and efficiency offered by an interpreted language.

Often, this means that a software provider must develop software twice: a first time in an interpreted language for prototyping and internal use, and a second time in a complied language for secure distribution to licensees. For example, an application program for the world wide web might first be developed in PERL for internal use, and then redeveloped in Java for external licensing.

One way to resolve this dilemma is to use a PERL compiler, which converts PERL scripts into C language code, and from this provide machine code. Notwithstanding, such an approach has at least three disadvantages. First, the solution is specific to the PERL language; second, in practice the compiled C code does not always execute properly; and third, an unauthorized party may be readily able to decompile the resulting machine code.

Another way to resolve the dilemma is to encrypt the source code. Following this approach, a licensee is provided with an encrypted source code file and with integrated decoding software that both decrypts and interprets the encrypted source code file. Unfortunately, this approach also has significant disadvantages. Chief among these is the disadvantage that the integrated decoding software is necessarily language dependent. For example, integrated decoding software useful for encrypted PERL source code files is not useful in the realm of any other programming language. Hence a software provider or a software licensee who works with a multiplicity of interpreted languages bears the inconvenience and expense of a multiplicity of integrated decoding software programs.

Thus there is a need for a way of protecting software written in interpreted languages that is convenient and secure, and which applies generically without dependence upon the particular interpreted language of choice.

SUMMARY

The present invention provides methods and computer program products for protecting computer software that is written in interpreted languages from unauthorized copying, alteration, distribution, or reverse engineering, and applies generally without regard to the specific choice of the interpreted language.

According to the invention, two items are input to an encoding program. One item is a language identifier that identifies the particular source code language; the second is a file that includes the source code itself. The encoding program encrypts the language identifier and the source code instructions, and provides an encrypted file that includes an encrypted language identifier and an encrypted version of the source code. The encrypted file may then be provided to a licensee without undue risk.

Further according to the invention, the encrypted file may be input to a decoding program, for example by a licensee. The decoding program decrypts the encrypted language identifier to reveal the programming language used, and opens a suitable interpreter. The decoding program decrypts the first encrypted source code instruction, passes the resulting decrypted source code instruction to the interpreter, and continues with subsequent source code instructions, decrypting the individual instructions and passing the decrypted results to the interpreter, until reaching the end of the encrypted file. The interpreter executes the instructions one by one, substantially in real time as they are received from the decoding program. Consequently, at any given time only a small portion of the source code ever exists in decrypted form.

Thus, according to the present invention, a single decoding program may be used with a number of different interpreted languages, and with a number of existing interpreters, thereby relieving licensees of the need to have a multiplicity of language-dependent decoding programs. These and other aspects and advantages of the invention will be more fully appreciated when considered in light of the following drawings and detailed description.

BRIEF DESCRIPTION OF THE DRAWINGS

FIG. 1 is a flowchart showing steps of a method for protecting source code of interpreted programming languages; and FIG. 2 is a flowchart showing steps of a method for processing source code that is written in an interpreted language and protected according to the method of FIG. 1.

DETAILED DESCRIPTION

The present invention provides methods and computer program products for protecting computer software that is written in interpreted programming languages from unauthorized copying, alteration, distribution, or reverse engineering, and for processing source code that is so protected. The inventive methods and computer program products apply generally, without regard to the specific choice of the language of the interpreted source code.

FIG. 1 is a flowchart that shows steps of a method for protecting source code of interpreted programming languages. The invention also includes computer program products and program storage devices tangibly embodying programs of instructions executable by machines to perform the method steps.

As shown in FIG. 1, an encoding program that embodies the inventive method determines a language identifier that identifies an interpreted language whose source code instructions are to be protected (step 100). The invention includes three ways of making this determination. In one embodiment, the encoding program reads the language identifier from a file that conveys the source code instructions to be protected. For example, the first line of the file may explicitly identify the programming language. In another embodiment, the encoding program deduces the programming language used, by examining the source code for signature traits that identify the language. In a third embodiment, the language identifier is entered manually into the encoding program, or into a register or memory location to be read by the encoding program, by an operator or programmer using a keyboard. The language identifier is passed to an encryption program within the encoding program and encrypted (step 110), to provide an encrypted language identifier.

The source code instructions that are to be protected are passed to the encoding program, and received by the encoding program (step 120). The encoding program then encrypts the source code instructions, to provide encrypted source code instructions (step 130). The encrypted language identifier and the encrypted source code instructions are merged by the encoding program, to provide an encrypted file (step 140). In another embodiment, the language identifier and the source code instructions may first be merged to provide a merged file, and the merged file then encrypted by the encoding program to provide an encrypted file that includes an encrypted language identifier and encrypted source code instructions. In a preferred embodiment, the encrypted language identifier appears as the first entry of the encrypted file, although this order of entry is, of course, a matter of convenience rather than a necessary condition of the invention.

For example, an exemplary PERL program might consist of a single instruction of source code: print "Hello". An exemplary language identifier for PERL might be: #!/usr/bin/perl. In this example, the language identifier and the instruction would be encrypted by the encoding program, and merged to provide the encrypted file, or first merged and then encrypted. The first entry of the encrypted file would be the encrypted language identifier; the second entry would be the encrypted source code instruction. As a result of the encryptions, the contents of the resulting encrypted file would be undecipherable by anyone not in possession of the decoding program (described below) and the appropriate decryption key.

To embody the invention, any suitable encryption and decryption programs may be used. An exemplary embodiment of the invention uses the so-called Tiny Encryption Algorithm (TEA), which is well known to those skilled in the art. The invention is not so limited, however, and a wide variety of other encryption and decryption programs known to those skilled in the art may be used as well, including single-key systems and systems having both public and private keys.

In a preferred embodiment of the invention, the decryption key needed by the decryption program is compiled into the decoding program. This is not a necessary condition of the invention, however, as the key may be provided to the decoding program by a user who enters the key on a command line, or by passing the key to the decoding program as a separate file, or by including the key in the encrypted file itself.

FIG. 2 is a flowchart that shows steps of a method for processing source code written in an interpreted language that is protected according to the method just described with reference to FIG. 1. The invention also includes computer program products and program storage devices tangibly embodying programs of instructions executable by machines to perform the method steps for processing the protected source code.

As shown in FIG. 2, a decoding program parses the encrypted file to identify the encrypted language identifier and the encrypted source code instructions (step 200). When the encrypted file is ordered as mentioned earlier, the step of parsing is uncomplicated: the first entry of the encrypted file is the encrypted language identifier, and the remaining entries are encrypted source code instructions. The decoding program, which includes a decryption program for decrypting text encrypted by the encryption program of the encoding program, then decrypts the encrypted language identifier, to provide the language identifier (step 210).

The decoding program opens an interpreter in accordance with the language identifier (step 220). For example, a licensee might have both a PERL interpreter and an APL interpreter. If the language identifier indicates that the protected source code instructions are written in PERL, the decoding program opens the PERL interpreter. A preferred embodiment of the invention, which uses the C programming language, opens the interpreter using the popen function, which is part of the C stdio library. The popen function creates a pipe to a command to be executed, which is the PERL interpreter in this example. Once the pipe has been opened, the popen function returns a pointer to a stream that can interact with the pipe. Read and Write actions can be performed on this stream. The decoding program feeds instructions to the interpreter, as further described below, by executing write statements to the stream associated with the opened pipe. It is not a necessary condition of the invention that either C or this method be used, however, as any other language and method may be used that provide a way to open and write to a pipe.

The decoding program decrypts the first encrypted source code instruction (step 230), and passes the resulting decrypted source code instruction to the interpreter for execution (step 240). The decoding program then determines whether the last source code instruction has been reached (step 250). If the last source code instruction has been reached, the process ends (step 260). Otherwise (i.e., the last source code instruction has not yet been reached), the decoding program returns to decrypt the next encrypted source code instruction (step 230), passes the resulting decrypted source code instruction to the interpreter for execution (step 240), and so on, looping until the last source code instruction is reached, at which point the process ends (step 260).

The decoding program passes decrypted source code instructions to the interpreter at a rate suitable for execution by the interpreter substantially in real time, i.e., at a rate that is commensurate with the rate at which the interpreter can execute these instructions substantially in real time. Controlling the rate at which instructions are passed in this way limits the number of source code instructions that exist in decrypted form at the interpreter's machine at any given time. In a preferred embodiment, the decoding program passes decrypted source code instructions to the interpreter one by one, withholding the next instruction until the interpreter is ready to execute that instruction. This loose synchronization may be maintained by having the interpreter return a "ready" indication to the decoding program, or by matching the execution rates of the decoding program and the interpreter and providing a buffer to account for second-order effects wherein the decoding program gets a little ahead of the interpreter. It is not a necessary condition of the invention, however, that decrypted source code instructions be passed to the interpreter literally one-by-one. In some situations, the decrypted source code instructions may be passed in groups that include more than one decrypted source code instruction.

From the preceding description, those skilled in the art will now appreciate that the present invention provides a language-independent way of protecting interpreted source code instructions form unauthorized copying, alteration, distribution, and reverse engineering. The foregoing description is illustrative rather than limiting, however, and the invention is limited only by the claims that follow.

I claim:

1. A method for processing encrypted source code written in an interpreted language, said method comprising the steps of:

parsing a file to identify an encrypted language identifier and encrypted source code instructions;

decrypting the encrypted language identifier to provide a language identifier;

opening an interpreter in accordance with the language identifier;

decrypting the encrypted source code instructions to provide source code instructions for execution by the interpreter; and passing the source code instructions to the interpreter.

2. The method of claim 1 wherein, in the step of passing the source code instructions, the source code instructions are passed at a rare suitable for execution substantially in real time by the interpreter.

3. The method of claim 1 wherein, in the step of passing the source code, the source code instructions are passed One by one at a rate suitable for execution substantially in real time by the interpreter.

4. The method of claim 1 wherein, in the step of passing the source code, each source code instruction is passed by the decoding program in response to a ready indication provided by the interpreter.

5. A method for protecting and processing source code of an interpreted programming language, said method comprising the steps of:

determining a language identifier that identifies an interpreted programming language;

passing the language identifier to an encoding program that includes an encryption program;

encrypting the language identifier by the encoding program to provide an encrypted language identifier;

passing source code instructions written in the interpreted language to the encoding program;

encrypting the source code instructions by the encoding program to provide encrypted source code instructions;

merging, by the encoding program, the encrypted language identifier and the encrypted source code instructions to provide an encrypted tile;

passing the encrypted file to a decoding program that includes a decryption program for decrypting text encrypted by the encryption program;

parsing the encrypted file by the decoding program to identify the encrypted language identifier and the encrypted Source code instructions;

decrypting, by the decoding program, the encrypted language identifier to provide the language identifier;

opening an interpreter, by the decoding program, in accordance with the language identifier;

decrypting the encrypted source code instructions, by the decoding program, to provide source code instructions for execution by the interpreter; and passing the source code instructions to the interpreter, by the decoding program, at a rate suitable for execution substantially in real time by the interpreter.

6. A method for protecting and processing source code of an interpreted programming language, said method comprising the steps of:

determining a language identifier that identifies an interpreted programming language;

merging, by an encoding program that includes an encryption program, the language identifier and source code written in the interpreted programming language, to provide a merged file;

encrypting the merged file, by the encoding program, to provide an encrypted file that includes an encrypted language identifier and encrypted source code instructions;

passing the encrypted file to a decoding program that includes a decryption program for decrypting text encrypted by the encryption program;

parsing the encrypted file by the decoding program to identify the encrypted language identifier and the encrypted source code instructions;

decrypting, by the decoding program, the encrypted language identifier to provide the language identifier;

opening an interpreter, by the decoding program, in accordance with the language identifier;

decrypting the encrypted source code instructions, by the decoding program, to provide source code instructions for execution by the interpreter; and passing the source code instructions to the interpreter, by the decoding program, at a rate suitable for execution substantially in real time by the interpreter.

7. A program storage device readable by a machine, tangibly embodying a program of instructions executable by the machine to perform method steps for protecting source code of an interpreted programming language, said method steps comprising:

accepting a language identifier that identifies an interpreted programming language;

encrypting the language identifier to provide an encrypted language identifier;

accepting source code instructions written in the interpreted language;

encrypting the source code instructions to provide encrypted source code instructions; and merging the encrypted language identifier and the encrypted source code instructions.

8. A program storage device readable by a machine, tangibly embodying a program of instructions executable by the machine to perform method steps for processing protected source code written in an interpreted language, said method steps comprising:

receiving an encrypted file;

parsing the encrypted file to identify an encrypted language identifier of an interpreted programming language and encrypted source code instructions of the interpreted programming language;

decrypting the encrypted language identifier to provide a language identifier;

opening an interpreter in accordance with the language identifier;

decrypting the encrypted source code instructions to provide source code instructions for execution by the interpreter; and passing the source code instructions to the interpreter at a rate suitable for execution substantially in real time by the interpreter.

* * * * *

UNITED STATES PATENT AND TRADEMARK OFFICE
CERTIFICATE OF CORRECTION

PATENT NO. : 7,093,119 B2 Page 1 of 1
APPLICATION NO. : 10/196534
DATED : August 15, 2006
INVENTOR(S) : James J. Rhodes It is certified that error appears in the above-identified patent and that said Letters Patent is hereby corrected as shown below:

Column 5, line 22, change "rare" to --rate--.
Column 5, line 25, change "One" to --one--.

Signed and Sealed this

Twenty-seventh Day of February, 2007

JON W. DUDAS
*Director of the United States Patent and Trademark Office*